United States Patent
Lin et al.

(10) Patent No.: US 9,628,392 B2
(45) Date of Patent: Apr. 18, 2017

(54) METHOD AND DEVICE FOR FORWARDING MESSAGE

(71) Applicant: Huawei Technologies Co., Ltd., Shenzhen, Guangdong (CN)

(72) Inventors: Chengyong Lin, Shenzhen (CN); Enhui Liu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 332 days.

(21) Appl. No.: 14/016,802

(22) Filed: Sep. 3, 2013

(65) Prior Publication Data

US 2014/0006637 A1    Jan. 2, 2014

Related U.S. Application Data

(63) Continuation of application No. PCT/CN2012/070702, filed on Jan. 21, 2012.

(51) Int. Cl.
| | |
|---|---|
| *G06F 15/16* | (2006.01) |
| *H04L 12/815* | (2013.01) |
| *H04L 12/721* | (2013.01) |
| *H04L 12/819* | (2013.01) |
| *H04L 12/823* | (2013.01) |

(52) U.S. Cl.
CPC .............. *H04L 47/22* (2013.01); *H04L 45/66* (2013.01); *H04L 47/215* (2013.01); *H04L 47/32* (2013.01)

(58) Field of Classification Search
CPC ......... H04L 47/10; H04L 47/32; H04L 47/22; H04L 47/215; H04L 49/25; G06F 15/16
USPC ......... 709/223, 236; 370/237, 252; 270/237, 270/252
See application file for complete search history.

(56) References Cited

U.S. PATENT DOCUMENTS 6,965,777 B1 * 11/2005 Cast .................... H04L 12/5895
                                                        370/237
6,975,876 B1 * 12/2005 Cast ..................... H04L 12/585
                                                        370/237
(Continued)

FOREIGN PATENT DOCUMENTS

| CN | 1925455 A | 3/2007 |
|---|---|---|
| CN | 102217228 A | 10/2011 |

OTHER PUBLICATIONS

International Search Report in corresponding PCT Patent Application No. PCT/CN2012/070702 (Nov. 1, 2012).

(Continued)

*Primary Examiner* — Tesfay Yohannes
(74) *Attorney, Agent, or Firm* — Leydig, Voit & Mayer, Ltd.

(57) ABSTRACT

A method for forwarding message, comprising: receiving, by a forwarding plane device, a first message, and looking up a first entry matched with the first message in a flow table of the forwarding plane device, wherein the forwarding plane device is a device compliant with a network architecture in which control and forwarding are separated; performing, by the forwarding plane device, a first operation on the first message for limiting its message forwarding rate according to the first entry. Further, a corresponding device is also provided in an embodiment of this disclosure. With the technical solutions provided in embodiments of this disclosure, the forwarding plane device can put limits on its message forwarding rate.

12 Claims, 1 Drawing Sheet

```
┌─────────────────────────────────────────────────┐
│ The forwarding plane device receives a first    │
│ message, and looks up a first entry matched     │
│ with the first message in a flow table of the   │──101
│ forwarding plane device, wherein the            │
│ forwarding plane device is a device compliant   │
│ with a network architecture in which control    │
│ and forwarding are separated.                   │
└─────────────────────────────────────────────────┘
                        │
                        ▼
┌─────────────────────────────────────────────────┐
│ The forwarding plane device performs a first    │
│ operation on the first message for limiting its │──102
│ message forwarding rate according to the first  │
│ entry.                                          │
└─────────────────────────────────────────────────┘
```

(56) References Cited

U.S. PATENT DOCUMENTS

| | | | | |
|---|---|---|---|---|
| 8,020,163 B2* | 9/2011 | Nollet | ............... | G06F 15/7825 |
| | | | | 370/400 |
| 8,291,258 B2* | 10/2012 | Narayanaswamy | | |
| | | | ............... | H04L 63/1408 |
| | | | | 709/224 |
| 8,345,548 B2* | 1/2013 | Gusat | ............... | H04L 45/00 |
| | | | | 370/230 |
| 8,560,663 B2* | 10/2013 | Baucke | ............... | H04L 45/50 |
| | | | | 370/255 |
| 8,694,825 B2* | 4/2014 | Cashman | ............... | H04L 67/1097 |
| | | | | 714/42 |
| 8,789,173 B2* | 7/2014 | Narayanaswamy | | |
| | | | ............... | H04L 63/1458 |
| | | | | 709/224 |
| 8,914,878 B2* | 12/2014 | Burns | ............... | H04L 63/1441 |
| | | | | 726/13 |
| 9,009,660 B1* | 4/2015 | Griffin | ............... | G06F 9/48 |
| | | | | 717/114 |
| 2009/0138577 A1 | 5/2009 | Casado et al. | | |
| 2011/0261688 A1 | 10/2011 | Sharma et al. | | |
| 2011/0261831 A1 | 10/2011 | Sharma et al. | | |
| 2011/0273988 A1 | 11/2011 | Tourrilhes et al. | | |
| 2011/0317559 A1* | 12/2011 | Kern | ............... | H04L 45/02 |
| | | | | 370/235 |
| 2013/0170503 A1* | 7/2013 | Ooishi | ............... | H04L 45/38 |
| | | | | 370/401 |

OTHER PUBLICATIONS

"OpenFlow Switch Specification," Version 1.2, Wire Protocol 0x03, Open Networking Foundation (Dec. 5, 2011).

Tanenbaum, "The Network Layer ED," Computer Networks, Chapter 5, pp. 379-386, Prentice Hall, Upper Saddle River, New Jersey (Dec. 31, 1996).

Medina et al., "A Multimedia Color Marker," Internet—Draft, Internet Engineering Task Force, IETF, Reston, Virginia (Oct. 1999).

Oral Proceedings in European Patent Application No. 12866111.3 (Aug. 26, 2016).

* cited by examiner

METHOD AND DEVICE FOR FORWARDING MESSAGE

CROSS-REFERENCE TO RELATED APPLICATIONS

This application is a continuation of International Patent Application No. PCT/CN2012/070702, filed on Jan. 21, 2012, which is hereby incorporated by reference in its entirety.

TECHNICAL FIELD

The embodiments of the present disclosure relates to the communication field and, more specifically, to a method and device for forwarding message.

DESCRIPTION OF THE RELATED ART

With the development of network architectures, various network architectures in which control and forwarding are separated have been emerged, for example, OpenFlow.

A network equipment compliant with a network architecture in which control and forwarding are separated comprises a forwarding plane device and a control plane device. The forwarding plane device processes received messages according to a flow table, and the control plane device controls the forwarding plane device through control channels.

The term "control and forwarding are separated" of network architectures in which control and forwarding are separated refers to the separation of forwarding plane and control plane devices. The forwarding plane device shifts some or all functions of the control plane to the control plane device. The forwarding plane device has the capability of communicating with the control plane device. The forwarding plane device may communicate with the control plane device through control channels.

The inventors have found the following technical problems occur in the prior art: the forwarding plane devices compliant with network architectures in which control and forwarding are separated cannot put limits on the message forwarding rate.

SUMMARY

A method and device for forwarding message are provided in embodiments of this disclosure, capable of addressing the problem of unable to put limits on the message forwarding rate by forwarding plane devices compliant with network architectures in which control and forwarding are separated.

In one aspect, a method for forwarding message is provided, comprising:

receiving, by a forwarding plane device, a first message, wherein the forwarding plane device is a device compliant with a network architecture in which control and forwarding are separated;

looking up, by the forwarding plane device, a first entry matched with the first message in a flow table of the forwarding plane device; and performing, by the forwarding plane device, a first operation on the first message for limiting a message forwarding rate of the forwarding plane device according to the first entry.

In another aspect, a device for forwarding message is provided, comprising:

a receiving unit for receiving a first message;

a matching unit for looking up a first entry matched with the first message in a flow table of the forwarding plane device, wherein the forwarding plane device is a device compliant with a network architecture in which control and forwarding are separated;

a processing unit for performing a first operation on the first message for limiting a message forwarding rate of the forwarding plane device according to the first entry.

Technical solutions provided herein provide for limiting the message forwarding rate, enabling the forwarding plane device to put limits on its message forwarding rate.

BRIEF DESCRIPTION OF THE DRAWINGS

For a more explicit description of the technical solutions of embodiments of this disclosure, a brief introduction of accompanying drawings to be used in the description of these embodiments will be given below. Accompanying drawings described below are merely some embodiments of this disclosure, for those skilled in the art, other accompanying drawings can be derived from these ones without any creative efforts.

DETAILED DESCRIPTION OF THE EMBODIMENTS

A clear, complete description is given to technical solutions of embodiments of this disclosure in connection with accompanying drawings of embodiments of this disclosure. Embodiments described herein are merely some embodiments of this disclosure, but not all of them. Based on those embodiments of this disclosure, other embodiments can occur to those skilled in the art without any creative efforts, all of which fall within the scope of this disclosure.

Embodiments of this disclosure relate to a network architecture in which control and forwarding are separated. The statement "control and forwarding are separated" of a network architecture in which control and forwarding are separated refers to the separation of forwarding plane and control plane devices. The forwarding plane device shifts some or all functions of the control plane to the control plane device. The forwarding plane device has the capability of communicating with the control plane device. The forwarding plane device may communicate with the control plane device through control channels.

The control plane device involved in this disclosure is a device compliant with a network architecture in which control and forwarding are separated. The forwarding plane device involved in this disclosure is a device compliant with a network architecture in which control and forwarding are separated. The forwarding plane device processes received messages according to a flow table. The control plane device controls the forwarding plane device through control channels.

In some implementations of message forwarding of the forwarding plane device, layer-2 messages can be forwarded or layer-3 messages can be forwarded. With regard to the layer 2 and layer 3, a reference can be made to the OSI model (Open Systems Interconnection model).

The forwarding plane device can be implemented as, for example, a switch or a router.

In the scenario of a forwarding plane device which is a switch, the forwarding plane device may be an OpenFlow switch. For OpenFlow switches, a reference can be made to the OpenFlow switch specification 1.0 released by SSO (Standard Setting Organization) OFN (OpenFlow Networking Foundation).

The control plane device can be implemented as, for example, an OpenFlow controller. For OpenFlow controllers, a reference can be made to the OpenFlow switch specification 1.0 released by the OFN.

The control channels can be implemented as, for example, security channels for interactions between an OpenFlow switch and an OpenFlow controller, for which a reference can be made to the OpenFlow switch specification 1.0 released by the OFN.

Embodiment 1

Figure 1:
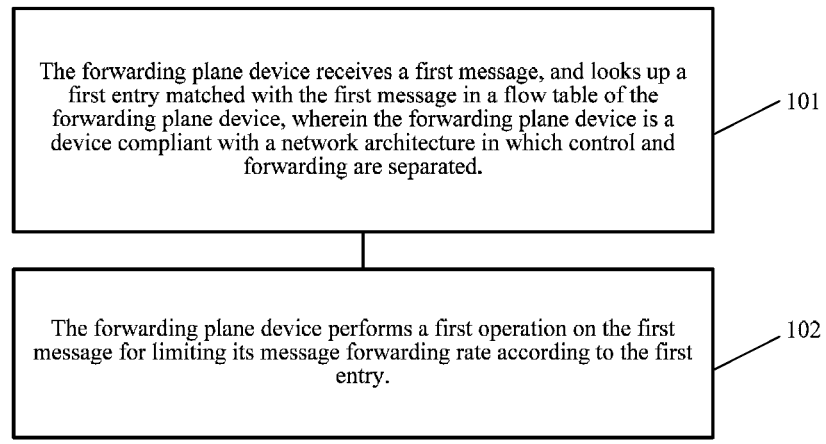
FIG. 1 is a flowchart of a method for forwarding message provided in an embodiment of this disclosure.

A method for forwarding message is provided in an embodiment of this disclosure, in which a forwarding plane device is allowed to put limits on its message forwarding rate. As shown in FIG. 1, the method comprises the following steps.

Step 101. The forwarding plane device receives a first message, and then the forwarding plane device looks up a first entry matched with the first message in a flow table, wherein the forwarding plane device is a device compliant with a network architecture in which control and forwarding are separated.

The first message can be realized as for example an IP (Internet Protocol) packet, or a MAC (Media Access Control) frame.

The forwarding plane device forwards messages according to the flow table. The forwarding plane device may have one flow table or a plurality of flow tables. A flow table of the forwarding plane device may contain one or more flow table entries. The first entry is a flow table entry matched with the first message. The forwarding plane device can produce the flow table in the following way.

The forwarding plane device can store a flow table in the forwarding plane device previously. Further, the forwarding plane device can receive a configuration message transmitted from the control plane device. The forwarding plane device can produce the flow table according to the configuration message.

In one implementation, a flow table entry may comprise match fields and count fields.

The match fields are used to determine whether the first message matches with the flow table entry. The match fields may comprise one or more match items. The match items may comprise a destination MAC (Media Access Control) protocol address, a source MAC protocol address, an IP (Internet Protocol) address or a MPLS (Multi-Protocol Label Switching) label. The count fields are used to count messages.

Step 102. The forwarding plane device performs a first operation on the first message for limiting its message forwarding rate according to the first entry.

The first operation is used to limit the message forwarding rate.

In the method provided in this disclosure, the forwarding plane device can perform operations on messages according to entries matched with the messages to limit their message forwarding rates. Therefore, the problem of unable to limit the message forwarding rate of the forwarding plane device in the prior art can be solved.

Optionally, step 102 may comprise the following step:

The forwarding plane device performs the first operation on the first message according to a first instruction in the first entry. The first instruction is an instruction corresponding to the first operation.

The first instruction is a computer instruction. The first instruction is an instruction corresponding to the first operation.

Optionally, step 102 may comprise the following step:

The forwarding plane device acquires the first instruction according to a first tag contained in the first entry, the forwarding plane device performs the first operation according to the first instruction, wherein the first tag is used to identify the first instruction and the first instruction is an instruction corresponding to the first operation.

The first instruction is an instruction corresponding to the first operation.

The first tag is used to identify the first instruction. In one implementation, the first tag may be a storage address of the first instruction. The first tag may be a label of storage address of the first instruction as well.

Optionally, performing, by the forwarding plane device, the first operation according to the first instruction may comprise the following step.

The forwarding plane device compares the number of tokens corresponding to the length of the first message and a first token number corresponding to a token bucket; when the number of tokens corresponding to the length of the first message is larger than the first token number, the forwarding plane device performs an operation other than forwarding operation on the first message.

In one implementation, the operation other than forwarding operation may be a discarding operation or an operation of up-sending to the control plane device through a control channel.

Optionally, comparing, by the forwarding plane device, the number of tokens corresponding to the length of the first message and a first token number corresponding to a token bucket may comprise the following steps.

The forwarding plane device updates a second token number corresponding to the token bucket to the first token number according to a token bucket maximum value and a token bucket increment value.

The forwarding plane device compares a token number corresponding to the length of the first message and the first token number.

In one implementation, the forwarding of the first message can be limited through the number of tokens in a token bucket. When the number of tokens in the token bucket is less than a token number corresponding to the length of the first message, the forwarding plane device cannot forward the first message. When the number of tokens in the token bucket is larger than or equal to the token number corresponding to the length of the first message, the forwarding plane device can forward the first message. After the forwarding, the number of tokens in the token bucket is reduced correspondingly.

In one implementation, the token bucket maximum value is used to limit the number of tokens in the token bucket. The number of tokens in the token bucket cannot exceed the token bucket maximum value. The token bucket increment value is used to increase the number of tokens in the token bucket. The number of tokens in the token bucket can be increased according to the token bucket increment value at a predetermined time interval. The second token number is a token number before the updating. The first token number is a token number after the updating.

Optionally, updating, by the forwarding plane device, the second token number corresponding to the token bucket to the first token number according to the token bucket maximum value and the token bucket increment value may comprise the following steps.

The forwarding plane device acquires the token bucket maximum value and the token bucket increment value according to a second tag contained in the first entry, wherein the second tag is an identification of a first instance; the second token number corresponding to the token bucket, the token bucket maximum value and the token bucket increment value are elements of the first instance; the first instance is stored in a storage space outside the first entry.

The forwarding plane device updates the second token number corresponding to the token bucket to the first token number according to the token bucket maximum value and the token bucket increment value.

Comparing, by the forwarding plane device, a token number corresponding to the length of the first message and the first token number may comprise the following steps.

The forwarding plane device acquires the first token number according to the second tag.

The forwarding plane device compares a token number corresponding to the length of the first message and the first token number.

In one implementation, the first instance can be an array, linked list, or structure. The second token number corresponding to the token bucket, the token bucket maximum value and the token bucket increment value are elements of the first instance. The second tag is an identification of the first instance. The forwarding plane device can acquire the first token number according to the second tag. The second tag may be a storage address of the first instance. The second tag may be label of a storage address of the first instance as well. When the first instance is an array, the second tag may be an array name of the array. When the first instance is a linked list, the second tag may be a head pointer of the linked list. When the first instance is a structure, the second tag may be a name of a variable corresponding to the structure.

The above technical solution has a benefit that it is not necessary to carry the second token number corresponding to the token bucket, the token bucket maximum value, and the token bucket increment value in the first entry.

Optionally, updating, by the forwarding plane device, the second token number corresponding to the token bucket to the first token number according to the token bucket maximum value and the token bucket increment value may comprise the following steps.

The forwarding plane device acquires the token bucket maximum value and the token bucket increment value according to a third tag, wherein the first entry contains the second tag; the second tag is an identification of a first instance; the second token number corresponding to the token bucket and the third tag are elements of the first instance; the first instance is stored in a storage space outside the first entry; the third tag is an identification of a second instance; the token bucket maximum value and the token bucket increment value are elements of the second instance; the second instance is stored in a storage space outside the first entry.

The forwarding plane device updates the second token number corresponding to the token bucket to the first token number according to the token bucket maximum value and the token bucket increment value.

Comparing, by the forwarding plane device, a token number corresponding to the length of the first message and the first token number may comprise the following steps.

The forwarding plane device acquires the first token number according to the second tag.

The forwarding plane device compares a token number corresponding to the length of the first message and the first token number.

In one implementation, the first instance can be an array, linked list, or structure. The second token number corresponding to the token bucket and the third tag are elements of the first instance. The second tag is an identification of the first instance. When the first instance is an array, the second tag may be an array name of the array. When the first instance is a linked list, the second tag may be a head pointer of the linked list. When the first instance is a structure, the second tag may be a name of a variable corresponding to the structure. The second instance can be an array, linked list, or structure. The token bucket maximum value and the token bucket increment value are elements of the second instance. The third tag is an identification of the second instance. When the second instance is an array, the third tag may be an array name of the array. When the second instance is a linked list, the third tag may be a head pointer of the linked list. When the second instance is a structure, the third tag may be a name of a variable corresponding to the structure. Therefore, the forwarding plane device can acquire the third tag and the second token number corresponding to the token bucket according to the second tag. The forwarding plane device can acquire the token bucket maximum value and the token bucket increment value according to the third tag. The forwarding plane device can update the second token number corresponding to the token bucket to the first token number according to the token bucket maximum value and the token bucket increment value. The forwarding plane device can acquire the updated token number, i.e., the first token number, according to the second tag.

The above technical solution has the following benefit: the storage space of the first entry can be saved because the second token number corresponding to the token bucket, the token bucket maximum value and the token bucket increment value are not carried in the first entry. Further, the second instance comprises the token bucket maximum value and the token bucket increment value. In addition to the first entry, other flow table entry can also employ the token bucket maximum value and the token bucket increment value in the second instance to update the numbers of tokens in token buckets corresponding to the other flow table entries. The other flow table entries are flow table entries except for the first entry.

In embodiments of this disclosure, the "first" of the term "the first entry" is used to indicate the first entry, but not to define a sequence. The "first" and "second" of the terms "the first token number" and "the second token number" are used to distinguish the first and second token numbers, and are not used to define a sequence. The "first", "second", "third" and "fourth" of the terms "the first unit", "the second unit", "the third unit" and "the fourth unit" are used to distinguish the first, second, third and fourth units, and are not used to define a sequence. The "first" and "second" of the first and second instances are used to distinguish the first and second instances, and are not used to define a sequence. The "first", "second" and "third" of the "first tag", the "second tag" and the "third tag" are used to distinguish the first, second and third tags, but are not used to define a sequence.

Embodiment 2

Figure 2:
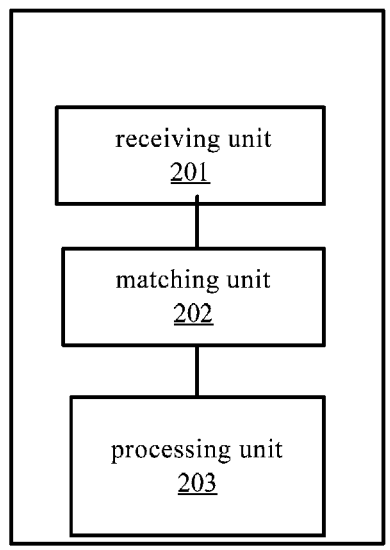
FIG. 2 is a schematic structural diagram of a device for forwarding message provided in an embodiment of this disclosure.

A device for forwarding message is provided in an embodiment of this disclosure. The device can be realized through the method provided in Embodiment 1. Through the technical solution provided in the embodiment of this disclosure, limits on the message forwarding rate can be imposed. As shown in FIG. 2, the device comprises: a receiving unit 201, a matching unit 202, and a processing unit 203.

The receiving unit 201 is configured to receive a first message.

In one implementation, the first message may be an IP packet or a MAC frame.

The matching unit 202 is configured to look up a first entry matched with the first message in a flow table of the forwarding plane device, wherein the forwarding plane device is a device compliant with a network architecture in which control and forwarding are separated.

The forwarding plane device forwards messages according to the flow table. The forwarding plane device may have one or a plurality of flow tables. A flow table of the forwarding plane device may contain one or more flow table entries. The first entry is a flow table entry matched with the first message. The forwarding plane device can produce the flow table in the following way.

The forwarding plane device can store a flow table in the forwarding plane device previously. Further, the forwarding plane device can receive a configuration message transmitted from the control plane device. The forwarding plane device can produce the flow table according to the configuration message.

In one implementation, a flow table entry may comprise match fields and count fields.

The match fields are used to determine whether the first message matches with the flow table entry. The match fields may comprise one or more match items. The match items may comprise a destination MAC protocol address, a source MAC protocol address, an IP address or a MPLS label. The count fields are used to count messages.

The processing unit 203 is configured to perform a first operation on the first message for limiting its message forwarding rate according to the first entry.

The first operation is used to limit the message forwarding rate.

It can be seen that, with the method provided in preset embodiment, the forwarding plane device can perform operations on messages according to entries matched with the messages to limit their forwarding rates. Therefore, the problem of unable to limit the message forwarding rate of the forwarding plane device in the prior art can be solved.

Optionally, the processing unit 203 may be used to:

perform the first operation on the first message according to a first instruction in the first entry. The first instruction is an instruction corresponding to the first operation.

The first instruction is a computer instruction. The first instruction is an instruction corresponding to the first operation.

Optionally, the processing unit 203 may be used to:

acquire the first instruction according to a first tag contained in the first entry; the forwarding plane device performs the first operation according to the first instruction, wherein the first tag is used to identify the first instruction and the first instruction is an instruction corresponding to the first operation.

Optionally, the processing unit 203 may comprise:

a comparing subunit for comparing the number of tokens corresponding to the length of the first message and a first token number corresponding to a token bucket;

a executing subunit for when the number of tokens corresponding to the length of the first message is larger than the first token number, performing an operation other than forwarding operation on the first message.

In one implementation, the operation other than forwarding operation may be a discarding operation or an operation of upsending to the control plane device through a control channel.

Optionally, the processing unit 203 may further comprise:

an updating subunit for updating a second token number corresponding to the token bucket to the first token number according to a token bucket maximum value and a token bucket increment value.

In one implementation, the forwarding of the first message can be limited through the number of tokens in a token bucket. When the number of tokens in the token bucket is less than a token number corresponding to the length of the first message, the forwarding plane device cannot forward the first message. When the number of tokens in the token bucket is larger than or equal to the token number corresponding to the length of the first message, the forwarding plane device can forward the first message. After the forwarding, the number of tokens in the token bucket is reduced correspondingly.

In one implementation, the token bucket maximum value is used to limit the number of tokens in the token bucket. The number of tokens in the token bucket cannot exceed the token bucket maximum value. The token bucket increment value is used to increase the number of tokens in the token bucket. The number of tokens in the token bucket can be increased according to the token bucket increment value at a predetermined time interval. The second token number is a token number before the updating. The first token number is a token number after the updating.

Optionally, the updating subunit comprises:

a first unit for acquiring the token bucket maximum value and the token bucket increment value according to a second tag contained in the first entry, wherein the second tag is an identification of a first instance; the second token number corresponding to the token bucket, the token bucket maximum value and the token bucket increment value are elements of the first instance; the first instance is stored in a storage space outside the first entry.

a second unit for updating the second token number corresponding to the token bucket to the first token number according to the token bucket maximum value and the token bucket increment value.

The comparing subunit comprises:

a third unit for acquiring the first token number according to the second tag;

a fourth unit for comparing the number of tokens corresponding to the length of the first message and the first token number provided by the second unit.

In one implementation, the first instance can be an array, linked list, or structure. The second token number corresponding to the token bucket, the token bucket maximum value and the token bucket increment value are elements of the first instance. The second tag is an identification of the first instance. The forwarding plane device can acquire the first token number according to the second tag. The second tag may be a storage address of the first instance. The second tag may be a label of storage address of the first instance as well. When the first instance is an array, the second tag may be an array name of the array. When the first instance is a linked list, the second tag may be a head pointer of the linked list. When the first instance is a structure, the second tag may be a name of a variable corresponding to the structure.

The above technical solution has a benefit that it is not necessary to carry the second token number corresponding to the token bucket, the token bucket maximum value, and the token bucket increment value in the first entry.

Optionally, the updating subunit may comprise:

a first unit for acquiring the token bucket maximum value and the token bucket increment value according to a third tag, wherein the first entry contains the second tag, the second tag is an identification of a first instance; the second token number corresponding to the token bucket and the third tag are elements of the first instance; the first instance is stored in a storage space outside the first entry; the third tag is an identification of a second instance; the token bucket maximum value and the token bucket increment value are elements of the second instance; the second instance is stored in a storage space outside the first entry.

a second unit for updating the second token number corresponding to the token bucket to the first token number according to the token bucket maximum value and the token bucket increment value provided by the first unit.

The comparing subunit comprises:

a third unit for acquiring the first token number according to the second tag;

a fourth unit for comparing the number of tokens corresponding to the length of the first message and the first token number provided by the second unit.

In one implementation, the first instance can be an array, linked list, or structure. The second token number corresponding to the token bucket and the third tag are elements of the first instance. The second tag is an identification of the first instance. When the first instance is an array, the second tag may be an array name of the array. When the first instance is a linked list, the second tag may be a head pointer of the linked list. When the first instance is a structure, the second tag may be a name of a variable corresponding to the structure. The second instance can be an array, linked list, or structure. The token bucket maximum value and the token bucket increment value are elements of the second instance. The third tag is an identification of the second instance. When the second instance is an array, the third tag may be an array name of the array. When the second instance is a linked list, the third tag may be a head pointer of the linked list. When the second instance is a structure, the third tag may be a name of a variable corresponding to the structure. Therefore, the forwarding plane device can acquire the third tag and the second token number corresponding to the token bucket according to the second tag. The forwarding plane device can acquire the token bucket maximum value and the token bucket increment value according to the third tag. The forwarding plane device can update the second token number corresponding to the token bucket to the first token number according to the token bucket maximum value and the token bucket increment value. The forwarding plane device can acquire the updated token number, i.e., the first token number, according to the second tag.

The above technical solution has the following benefit: the storage space of the first entry can be saved because the second token number corresponding to the token bucket, the token bucket maximum value and the token bucket increment value are not carried in the first entry. Further, the second instance comprises the token bucket maximum value and the token bucket increment value. In addition to the first entry, other flow table entry can also employ the token bucket maximum value and the token bucket increment value in the second instance to update the numbers of tokens in token buckets corresponding to the other flow table entries. The other flow table entries are flow table entries except for the first entry.

In embodiments of this disclosure, the "first" of the term "the first entry" is used to indicate the first entry, but not to define a sequence. The "first" and "second" of the terms "the first token number" and "the second token number" are used to distinguish the first and second token numbers, and are not used to define a sequence. The "first", "second", "third" and "fourth" of the terms "the first unit", "the second unit", "the third unit" and "the fourth unit" are used to distinguish the first, second, third and fourth units, and are not used to define a sequence. The "first" and "second" of the first and second instances are used to distinguish the first and second instances, and are not used to define a sequence. The "first", "second" and "third" of the "first tag", the "second tag" and the "third tag" are used to distinguish the first, second and third tags, but are not used to define a sequence.

Those skilled in the art can clearly understand that units and algorithm steps in various examples described in connection with embodiments of this disclosure can be implemented by electric hardware, computer software, or a combination of thereof. Whether to implement by hardware or software depends on particular applications and design restrictions of the technical solution. Those skilled in the art may realize the described functions in different ways for each particular application, which however should not be considered as going beyond the scope of this disclosure.

It can be clearly understood by persons skilled in the art that, for the purpose of convenient and brief description, for a detailed working process of the foregoing system, device and unit, reference may be made to the corresponding process in the method embodiments, and the details will not be described herein again.

In several embodiments provided in the present application, it should be understood that the disclosed system, device, and method may be implemented in other ways. For example, the described device embodiments are merely exemplary. For example, the unit division is merely logical function division and can be other divisions in actual implementation. For example, multiple units or components can be combined or integrated into another system, or some features can be ignored or not performed. Furthermore, the shown or discussed coupling or direct coupling or communication connection may be accomplished through indirect coupling or communication connection between some interfaces, devices or units in an electrical form, a mechanical form, or in other forms.

Units described as separate components may be or may not be physically separated. Components shown as units may be or may not be physical units, that is, may be located in one place, or distributed to multiple network units. Some or all of the units may be selected to achieve the objective of the solution of the embodiment according to actual requirements.

In addition, various functional units according to each embodiment of the present disclosure may be integrated in one processing module or may exist as separate physical units, or two or more units may also be integrated in one unit.

When the above functions are implemented in the form of the software functional module and sold or used as a separate product, they may be stored in a computer readable storage medium. Therefore, the technical solution of the present disclosure or the part that makes contributions to the prior art can be substantially embodied in the form of a software product. The computer software product is stored in a storage medium, and contains several instructions to instruct computer equipment (such as, a personal computer, a server, or network equipment) to perform all or part of steps of the method as described in the embodiments of the present disclosure. The storage medium includes various media capable of storing program codes, such as, a flash disk, a mobile hard disk, a Read-Only Memory (ROM), a Random Access Memory (RAM), a magnetic disk or an optical disk.

The above are merely exemplary embodiments of the present disclosure, but the protection scope of the present disclosure is not limited herein. Any change or replacement that can be easily figured out by persons skilled in the art within the technical scope disclosed by the present disclosure shall be covered by the protection scope of the present disclosure. Therefore, the protection scope of the present disclosure shall be defined by the claims.

What is claimed is:

1. A method for forwarding a message, the method comprising:
   receiving, by a forwarding plane device, a first message, wherein the forwarding plane device is a device compliant with an OpenFlow network architecture in which control and forwarding are separated;
   looking up, by the forwarding plane device, a first entry matched with the first message in a flow table of the forwarding plane device; and
   performing, by the forwarding plane device, a first operation on the first message for limiting a message forwarding rate of the forwarding plane device according to a first instruction in the first entry, wherein the first instruction is an instruction corresponding to the first operation,
   wherein the first operation comprises:
      comparing, by the forwarding plane device, a number of tokens corresponding to a length of the first message and a first token number corresponding to a token bucket; and
      when the number of tokens corresponding to the length of the first message is larger than the first token number, performing, by the forwarding plane device, an operation other than the forwarding operation on the first message;
   wherein comparing, by the forwarding plane device, the number of tokens corresponding to the length of the first message and the first token number corresponding to the token bucket comprises:
      updating, by the forwarding plane device, a second token number corresponding to the token bucket to the first token number according to a token bucket maximum value and a token bucket increment value; and
      comparing, by the forwarding plane device, the number of tokens corresponding to the length of the first message and the first token number.

2. The method according to claim 1, wherein the step of performing the first operation on the first message comprises:
   acquiring, by the forwarding plane device, the first instruction according to a first tag included in the first entry; and
   performing, by the forwarding plane device, the first operation according to the first instruction, wherein the first tag is used to identify the first instruction, and the first instruction is an instruction corresponding to the first operation.

3. The method according to claim 2, wherein updating, by the forwarding plane device, the second token number corresponding to the token bucket to the first token number according to the token bucket maximum value and the token bucket increment value comprises:
   acquiring, by the forwarding plane device, the token bucket maximum value and the token bucket increment value according to a second tag, wherein the second tag is included in the first entry; the second tag is an identification of a first instance; the second token number corresponds to the token bucket; the token bucket maximum value and the token bucket increment value are elements of the first instance; and the first instance is stored in a storage space outside the first entry; and
   updating, by the forwarding plane device, the second token number corresponding to the token bucket to the first token number according to the token bucket maximum value and the token bucket increment value;
   wherein, comparing, by the forwarding plane device, the number of tokens corresponding to the length of the first message and the first token number comprises:
      acquiring, by the forwarding plane device, the first token number according to the second tag; and
      comparing, by the forwarding plane device, the number of tokens corresponding to the length of the first message and the first token number.

4. The method according to claim 3, wherein the first instance is an array, a linked list, or a structure.

5. The method according to claim 2, wherein updating, by the forwarding plane device, the second token number corresponding to the token bucket to the first token number according to the token bucket maximum value and the token bucket increment value comprises:
   acquiring, by the forwarding plane device, the token bucket maximum value and the token bucket increment value according to a third tag, wherein the first entry includes the second tag; the second tag is an identification of a first instance; the second token number corresponding to the token bucket and the third tag are elements of the first instance; the first instance is stored in a storage space outside the first entry; the third tag is an identification of a second instance; the token bucket maximum value and the token bucket increment value are elements of the second instance; and the second instance is stored in a storage space outside the first entry; and
   updating, by the forwarding plane device, the second token number corresponding to the token bucket to the first token number according to the token bucket maximum value and the token bucket increment value;
   wherein comparing, by the forwarding plane device, the number of tokens corresponding to the length of the first message and the first token number comprises:
      acquiring, by the forwarding plane device, the first token number according to the second tag; and
      comparing, by the forwarding plane device, the number of tokens corresponding to the length of the first message and the first token number.

6. The method according to claim 5, wherein the second instance is an array, a linked list, or a structure.

7. A computer system, comprising:
   a processor; and
   a non-transitory computer readable storage medium storing instructions that, when executed by the processor, cause the computer system to perform the steps of:
      receiving a first message;
      looking up a first entry matched with the first message in a flow table of a forwarding plane device, wherein the forwarding plane device is a device compliant with an OpenFlow network architecture in which control and forwarding are separated; and performing a first operation on the first message for limiting a message forwarding rate of the forwarding plane device according to a first instruction in the first entry, wherein the first instruction is an instruction corresponding to the first operation, wherein the performing the first operation on the first message comprises:

comparing a number of tokens corresponding to a length of the first message and a first token number corresponding to a token bucket;

when the number of tokens corresponding to the length of the first message is larger than the first token number, performing an operation other than the forwarding operation on the first message; and updating a second token number corresponding to the token bucket to the first token number according to a token bucket maximum value and a token bucket increment value.

8. The device according to claim 7, wherein the performing the first operation on the first message comprises:

acquiring the first instruction according to a first tag contained in the first entry, wherein the forwarding plane device performs the first operation according to the first instruction, the first tag is used to identify the first instruction, and the first instruction is an instruction corresponding to the first operation.

9. The device according to claim 8, wherein the updating comprises:

acquiring the token bucket maximum value and the token bucket increment value according to a second tag contained in the first entry, wherein the second tag is an identification of a first instance; the second token number corresponding to the token bucket; the token bucket maximum value and the token bucket increment value are elements of the first instance; and the first instance is stored in a storage space outside the first entry, and updating the second token number corresponding to the token bucket to the first token number according to the token bucket maximum value and the token bucket increment value; and wherein the comparing comprises:

acquiring the first token number according to the second tag, and comparing the number of tokens corresponding to the length of the first message and the first token number.

10. The device according to claim 9, wherein the first instance is an array, a linked list, or a structure.

11. The device according to claim 8, wherein the updating comprises:

acquiring the token bucket maximum value and the token bucket increment value according to a third tag, wherein the first entry contains the second tag; the second tag is an identification of a first instance; the second token number corresponding to the token bucket and the third tag are elements of the first instance; the first instance is stored in a storage space outside the first entry; the third tag is an identification of a second instance; the token bucket maximum value and the token bucket increment value are elements of the second instance; and the second instance is stored in a storage space outside the first entry, and updating the second token number corresponding to the token bucket to the first token number according to the token bucket maximum value and the token bucket increment value; and wherein the comparing comprises:

acquiring the first token number according to the second tag, and comparing the number of tokens corresponding to the length of the first message and the first token number.

12. The device according to claim 11, wherein the first and the second instances are arrays, linked lists, or structures.

* * * * *